United States Patent
Yang et al.

(10) Patent No.: US 8,866,512 B2
(45) Date of Patent: Oct. 21, 2014

(54) FEEDBACK TERMINAL OF POWER CONVERTER HAVING PROGRAMMING FUNCTION FOR PARAMETER SETTING

(75) Inventors: Ta-yung Yang, Milpitas, CA (US);
Yen-Ting Chen, New Taipei (TW);
Tien-Chi Lin, New Taipei (TW);
Kai-Fang Wei, Hsinchu (TW)

(73) Assignee: System General Corp., Taipei Hsien (TW)

( * ) Notice: Subject to any disclaimer, the term of this patent is extended or adjusted under 35 U.S.C. 154(b) by 227 days.

(21) Appl. No.: 13/217,827

(22) Filed: Aug. 25, 2011

(65) Prior Publication Data
US 2012/0212202 A1 Aug. 23, 2012

Related U.S. Application Data

(60) Provisional application No. 61/444,166, filed on Feb. 18, 2011.

(51) Int. Cl.
*H03K 5/00* (2006.01)
*H02M 3/156* (2006.01)
*H02M 1/00* (2006.01)

(52) U.S. Cl.
CPC ...... *H02M 3/156* (2013.01); *H02M 2001/0025* (2013.01)

USPC .............................. 327/94; 327/158; 323/268

(58) Field of Classification Search
USPC .......... 363/16–20, 21.8, 21.12, 21.15, 56.01, 363/56.12; 323/282–288; 327/141, 149, 327/243, 253, 509; 365/185.19, 185.28, 365/185.25, 226, 207
See application file for complete search history.

(56) References Cited

U.S. PATENT DOCUMENTS

| | | | | |
|---|---|---|---|---|
| 5,986,936 A | * | 11/1999 | Ravazzini | 365/185.19 |
| 6,385,059 B1 | * | 5/2002 | Telefus et al. | 363/21.15 |
| 6,466,481 B1 | * | 10/2002 | Pasotti et al. | 365/185.21 |
| 6,744,649 B1 | * | 6/2004 | Yang et al. | 363/98 |
| 7,932,709 B1 | * | 4/2011 | Ling | 323/285 |
| 8,472,214 B2 | * | 6/2013 | Huang et al. | 363/21.18 |

* cited by examiner

*Primary Examiner* — Rajnikant Patel
(74) *Attorney, Agent, or Firm* — Muncy, Geissler, Olds & Lowe, P.C.

(57) ABSTRACT

A control circuit of a power converter according to the present invention comprises a switching circuit, a sample-and-hold circuit and a current source. The switching circuit generates a switching signal in response to a feedback signal. The sample-and-hold circuit samples the feedback signal. The current source is coupled to a feedback terminal for generating a programming voltage. A programmable signal is generated in accordance with the programming voltage and the feedback signal, and the programmable signal is coupled to set a parameter.

11 Claims, 3 Drawing Sheets

FEEDBACK TERMINAL OF POWER CONVERTER HAVING PROGRAMMING FUNCTION FOR PARAMETER SETTING

BACKGROUND OF THE INVENTION

1. Field of the Invention

The present invention is related to a switching power controller, especially to a feedback terminal for the switching power controller. This feedback terminal is used for receiving a feedback signal and providing programming function for parameter setting.

2. Description of the Related Art

FIG. 1 shows a circuit diagram of a conventional power converter. As shown in FIG. 1, an inductor 10, a transistor 15, a rectifier 20 and a capacitor 25 develop a boost converter 30. One terminal of the inductor 10 receives an input voltage $V_{IN}$. The other terminal of the inductor 10 is connected to an anode of the rectifier 20 and a drain terminal of the transistor 15. A source terminal of the transistor 15 is connected to a ground. A gate terminal of the transistor 15 receives a switching signal $S_W$. A cathode of the rectifier 20 is connected to a positive terminal of the capacitor 25. The capacitor 25 with a negative terminal is connected to the ground. An output voltage $V_O$ is generated across the capacitor 25.

A controller (CNTR) 50 generates the switching signal $S_W$ at an output terminal SW to switch the transistor 15 for producing the output voltage $V_o$ of the boost converter 30. A voltage divider developed by resistors 41 and 42 is coupled to the output voltage $V_O$ for generating a feedback signal $V_{FB}$. The resistor 41 is connected to the output voltage $V_O$ and the resistor 42 in series. The resistor 42 is further connected to the ground. The feedback signal $V_{FB}$ is generated at a joint of the resistors 41 and 42, and is applied to a feedback terminal FB of the controller 50 for generating the switching signal $S_W$ and regulating the output voltage $V_O$. A programmable signal $S_P$ is sensed on one end of a sensing resistor 40, which is connected to the controller 50 for parameter setting. The other end of the sensing resistor 40 is connected to the ground. Parameter settings are used to control a multi-phase power converter with master and slave controllers for higher output power.

BRIEF SUMMARY OF THE INVENTION

The object of the present invention is to provide a controller without a sensing resistor outside the controller for reducing the amount of the pins of the controller and cost for production.

The control circuit of a power converter according to the present invention comprises a switching circuit for generating a switching signal in response to a feedback signal. A sample-and-hold circuit is used to sample the feedback signal. A current source is coupled to a feedback terminal for generating a programming voltage. A programmable signal is generated in accordance with the programming voltage and the feedback signal, and the programmable signal is coupled to set a parameter. Further, the sample-and-hold circuit samples the feedback signal during a first period, and the current source is coupled to the feedback terminal during a second period for generating the programming voltage.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is the best-contemplated mode to carry out the invention. This description is made for the purpose of illustrating the general principles of the invention and should not be taken as limitation. Like numerals are used for like and corresponding parts of the various drawings. Embodiments of the present invention and their advantages are best understood by referring to the attached drawings.

Figure 2:
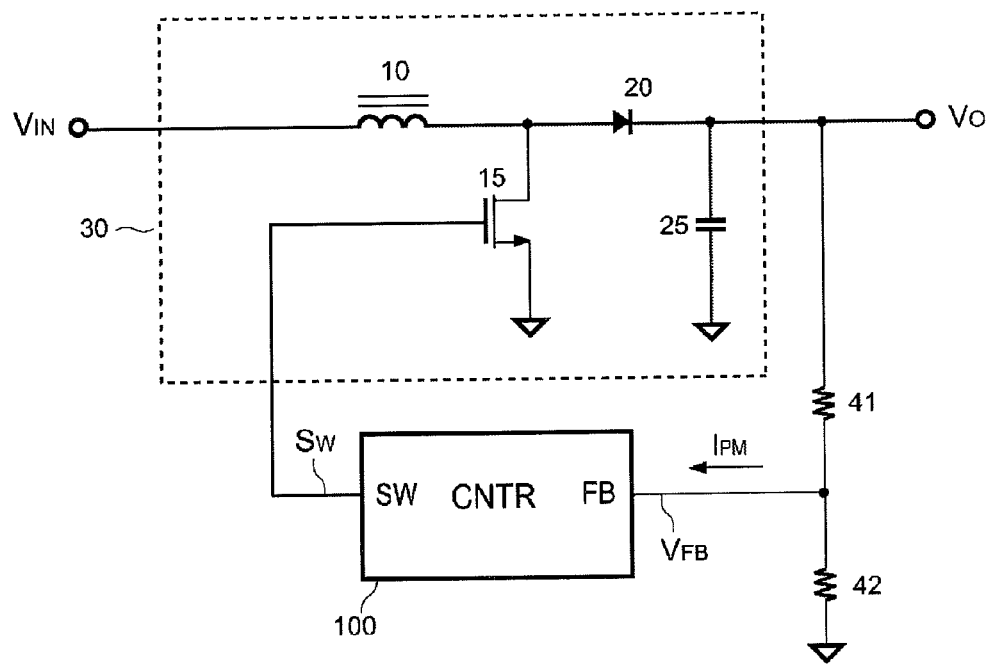
FIG. 2 shows a circuit diagram of a preferred embodiment of a power converter in accordance with the present invention.

FIG. 2 is a circuit diagram of a preferred embodiment of a power converter in accordance with the present invention. The power converter comprises a controller 100 (CNTR), the boost converter 30, and the resistors 41 and 42. The controller 100 with a feedback terminal FB and an output terminal SW is coupled to the boost converter 30 and generates a switching signal $S_W$ for controlling the boost converter 30 and regulating the output voltage $V_O$. The feedback terminal FB is connected between the resistors 41 and 42, and is utilized to receive a feedback signal $V_{FB}$ and determine a programmable signal $S_{PM}$ shown in FIG. 3 for parameter setting. The feedback signal $V_{FB}$ is correlated to the output voltage $V_O$ of the boost converter 30. The resistors 41 and 42 develop a voltage divider. The resistor 41 is connected to the output voltage $V_O$ and the resistor 42, that is further connected to the ground.

Figure 1:
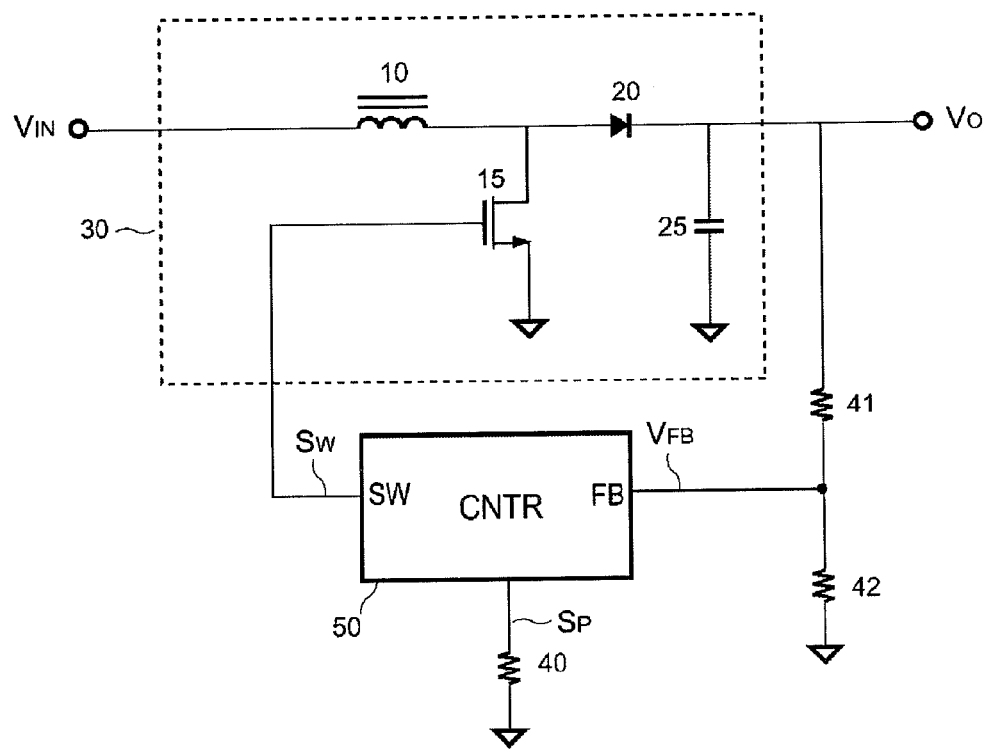
FIG. 1 shows a circuit diagram of a conventional power converter.

A current $I_{PM}$ from the output voltage $V_O$ of the boost converter 30 will flow into the feedback terminal FB of the controller 100 periodically. The resistance of the resistors 41 and 42 will decide the programmable signal $S_{PM}$. The description of the boost converter 30 can be found above, and detailed description of the boost converter 30 is not repeated here. The difference between FIG. 1 and FIG. 2 is that the sensing resistor 40 in FIG. 2 is omitted.

Figure 3:
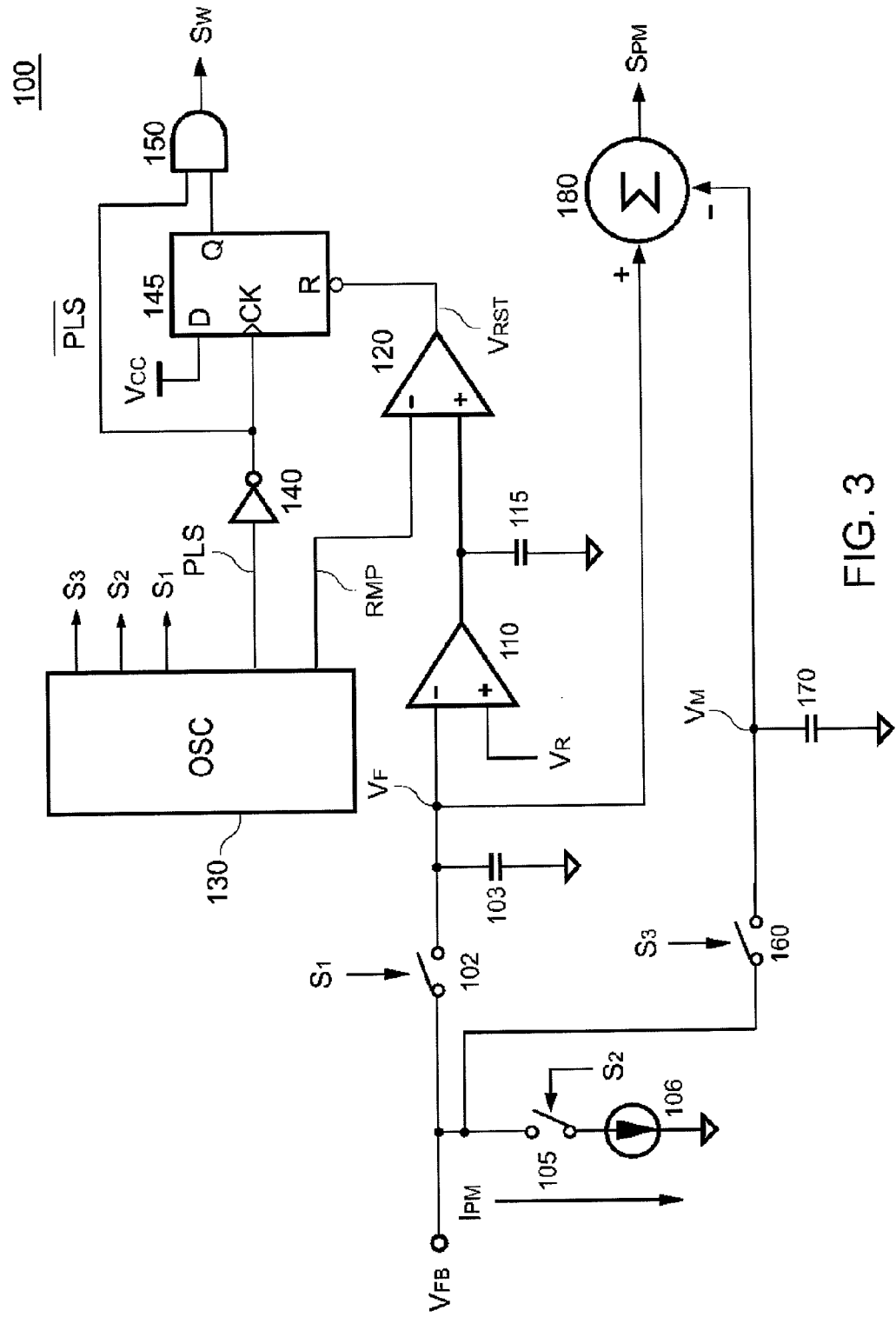
FIG. 3 shows a circuit diagram of a preferred embodiment of a controller in accordance with the present invention.

FIG. 3 is a circuit diagram of a preferred embodiment of the controller 100 in accordance with the present invention. The controller 100 comprises a sample-and-hold circuit, a switching circuit, a switch 105 and a current source 106. The sample-and-hold circuit comprises switches 102 and 160, and capacitors 103 and 170. The switching circuit comprises an error amplifier 110, a capacitor 115, a comparator 120, an oscillation circuit (OSC) 130, an inverter 140, a flip-flop 145 and an AND gate 150, and is used to generate the switching signal $S_W$ in response to the feedback signal $V_{FB}$. The sample-and-hold circuit including the switches 102 and 160, and the capacitors 103 and 170 is used to sample and hold the feedback signal $V_{FB}$ for determining the programmable signal $S_{PM}$. The oscillation circuit 130 determines a reset signal $V_{RST}$ and provides clock signals to the flip-flop 145. The AND gate 150 generates the switching signal $S_W$.

The feedback signal $V_{FB}$ is applied to the controller 100 through the feedback terminal FB shown in FIG. 2. One terminal of the switch 102 is coupled to the feedback terminal FB and one terminal of the switch 105. The other terminal of the switch 102 is coupled to one terminal of the capacitor 103. The other terminal of the capacitor 103 is coupled to the ground. The other terminal of the switch 105 is coupled to one terminal of the current source 106. The other terminal of the current source 106 is coupled to the ground. The feedback signal $V_{FB}$ is sampled into the capacitor 103 when the switch 102 is turned on by a timing-signal $S_1$. A negative input of the error amplifier 110 is coupled to one terminal of the capacitor 103 for receiving a sample voltage $V_F$. The sample voltage $V_F$ is correlated to the feedback signal $V_{FB}$. A reference signal $V_R$ is applied to a positive input of the error amplifier 110 for regulation of the boost converter 30 shown in FIG. 2.

The capacitor 115 is coupled to an output of the error amplifier 110 for frequency compensation. The output of the error amplifier 110 is further coupled to a positive input of the comparator 120. The oscillation circuit 130 generates a ramp signal RMP applied to a negative input of the comparator 120. Through comparing the ramp signal RMP with the output of the error amplifier 110, an output of the comparator 120 is coupled to a reset terminal R of the flip-flop 145 for generating the reset signal $V_{RST}$ to reset the flip-flop 145. An input terminal D of the flip-flop 145 receives a supply voltage $V_{CC}$. The oscillation circuit 130 generates a pulse signal PLS applied to a clock input CK of the flip-flop 145 to turn on the flip-flop 145 via the inverter 140.

An output of the inverter 140 and an output Q of the flip-flop 145 are connected to input terminals of the AND gate 150 for generating the switching signal $S_W$. Through the inverter 140, an on-time period of the pulse signal PLS provides a limitation to the maximum on time of the switching signal $S_W$. The inverter 140 reverses the pulse signal PLS to generate a reversed pulse signal coupled to one of the input terminals of the AND gate 150. The timing signals $S_1$, $S_2$ and $S_3$ are programmable and generated by the oscillation circuit 130 during the switching signal $S_W$ is disabled.

The capacitor 103 is further coupled to a positive input of an adder 180. One terminal of the switch 160 is coupled to the feedback terminal FB shown in FIG. 2 for receiving the feedback signal $V_{FB}$. The other terminal of the switch 160 is coupled to a negative input of the adder 180 and one terminal of the capacitor 170. The other terminal of the capacitor 170 is coupled to the ground. A programming voltage $V_M$ is generated across the capacitor 170. The negative input of the adder 180 is coupled to one terminal of the capacitor 170 to receive the programming voltage $V_M$. The programmable signal $S_{PM}$ is generated at an output of the adder 180 for parameter setting. The switch 160 is controlled by the timing-signal $S_3$. The current source 106 is coupled to the feedback terminal FB via the switch 105 controlled by the timing signal $S_2$.

When the timing-signal $S_1$ is enabled, the timing signals $S_2$ and $S_3$ are disabled, and the level of the feedback signal $V_{FB}$ is sampled into the capacitor 103. The sample voltage $V_F$ is generated across the capacitor 103. When the timing signal $S_2$ is enabled, the timing signal $S_1$ is disabled, and the current $I_{PM}$ flows into the feedback terminal FB. Therefore, the programmable signal $S_{PM}$ is determined by the difference between the sample voltage $V_F$ and the programming voltage $V_M$. In other words, the programmable signal $S_{PM}$ is generated in accordance with the programming voltage $V_M$ and the sample voltage $V_F$ correlated to the feedback signal $V_{FB}$.

Equations (1) to (4) describe the relationships among equivalent resistance of the resistors 41 and 42 shown in FIG. 2, the feedback signal $V_{FB}$, the output voltage $V_O$ and the current $I_{PM}$.

$$V_{FB} = \frac{R_{42}}{R_{41} + R_{42}} \times V_O \tag{1}$$

$$R_{EQ} = \frac{R_{41} \times R_{42}}{R_{41} + R_{42}} \tag{2}$$

$$V_M = I_{PM} \times R_{EQ} \tag{3}$$

$$S_{PM} = V_{FB} - (I_{PM} \times R_{EQ}) \tag{4}$$

Equation (1) shows that the value of the feedback signal $V_{FB}$ is determined by the equivalent resistance from the feedback terminal FB and the output voltage $V_O$. The timing signal $S_3$ is applied to be enabled during the on-time period of the timing signal $S_2$, and the programming voltage $V_M$ is generated at the feedback terminal FB and sampled into the capacitor 170 during the on-time period of the timing signal $S_3$. The value of the programming voltage $V_M$ is determined by the current $I_{PM}$ and the equivalent resistance from the feedback terminal FB, which is shown in equation (3). The current $I_{PM}$ is correlated to the current source 106 to generate the programming voltage $V_M$ with the equivalent resistance determined by the resistors 41 and 42. The programmable signal $S_{PM}$ is thus generated for parameter setting. The equivalent resistance of the resistors 41, 42 and the current $I_{PM}$ (current source 106) determine the value of the programmable signal $S_{PM}$, which is shown by equation (4).

Figure 4:
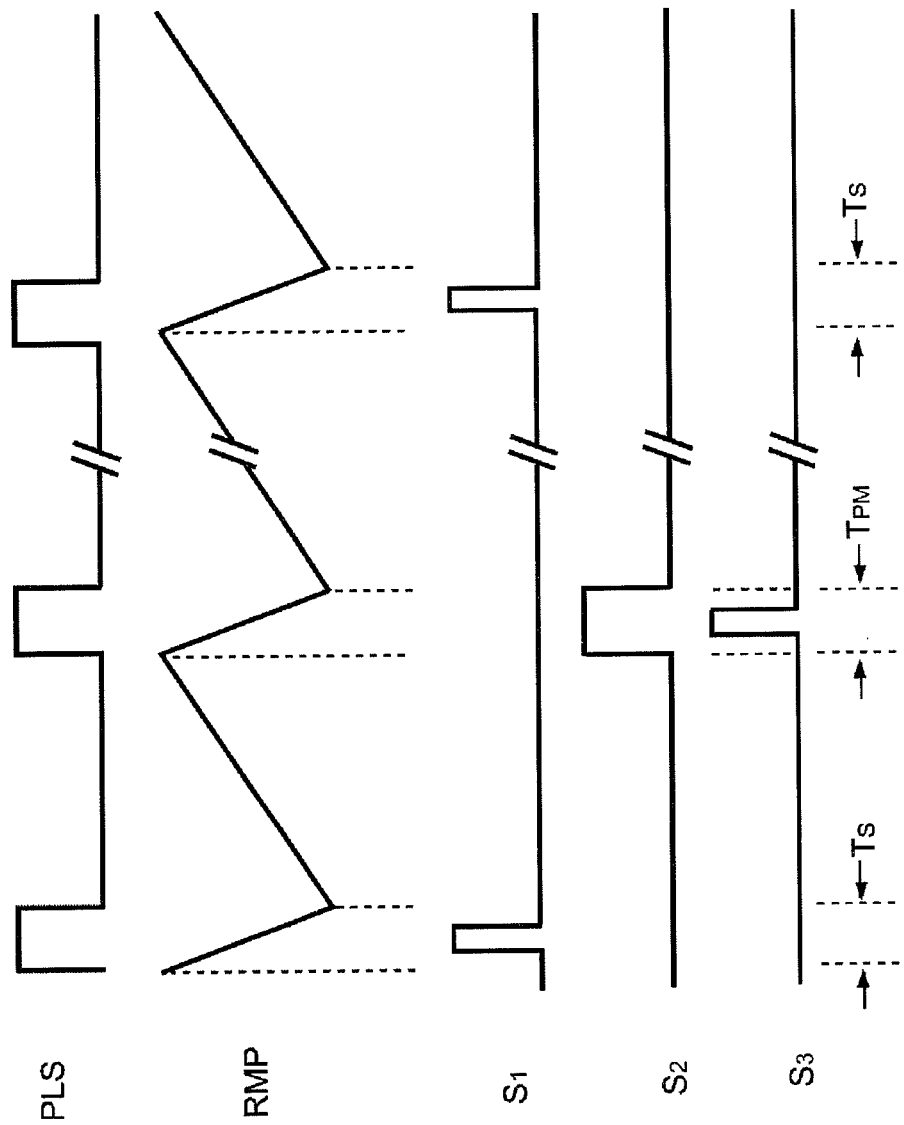
FIG. 4 shows the waveforms of the pulse signal PLS, the ramp signal RMP and the timing signals $S_1$ to $S_3$ in accordance with the present invention.

FIG. 4 shows the waveforms of the pulse signal PLS, the ramp signal RMP and the timing signals $S_1$ to $S_3$ in accordance with the present invention. The ramp signal RMP is decreased when the pulse signal PLS is enabled, and the ramp signal RMP is increased once the pulse signal PLS is disabled. During a first on-time period $T_S$ of the pulse signal PLS, the timing signal $S_1$ is enabled to turn on the switch 102 and to sample the feedback signal $V_{FB}$ into the capacitor 103. The sample voltage $V_F$ is generated across the capacitor 103. The on-time period of the timing signal $S_1$ is smaller than the on-time period of the pulse signal PLS. When the timing signal $S_1$ is enabled, the timing signal $S_2$ and the timing signal $S_3$ are applied to be disabled.

During a second on-time period $T_{PM}$ of the pulse signal PLS, the timing signal $S_2$ and the timing signal $S_3$ are enabled to turn on the switches 105 and 160 for sampling the feedback signal $V_{FB}$ into the capacitor 170. The current source 106 is coupled to the feedback terminal FB through the switch 105 for generating the programming voltage $V_M$ when the switches 105 and 160 are turned on. The on-time period of the timing signal $S_2$ is almost as long as the on-time period of the pulse signal PLS. The on-time period of the timing signal $S_3$ is preferably applied to be shorter than the on-time period of the timing signal $S_2$. When the timing signal $S_2$ is enabled and the switch 105 is turned on, the current $I_{PM}$ flows into the feedback terminal FB. As a result, the programming voltage $V_M$ sampled into the capacitor 170 will be dropped instantly when the timing signal $S_3$ is enabled and the switch 160 is turned on. The programming voltage $V_M$ sampled into the capacitor 170 during the second on-time period $T_{PM}$ is a little less than the sample voltage $V_F$ sampled into the capacitor 103 during the first on-time period $T_S$.

The on-time period of the timing signal $S_2$ is almost as long as the on-time period of the pulse signal PLS. The on-time period of the timing signal $S_3$ is preferably applied to be shorter than the on-time period of the timing signal $S_2$. The on-time period of the timing signal $S_2$ is preferably applied to be longer than the on-time period of the timing signal $S_1$. The timing signals $S_1$, $S_2$ and $S_3$ are programmable and generated by the oscillation circuit 130 during the switching signal $S_W$ is disabled.

Based on the present invention, a sensing resistor shown in FIG. 1 is not required to be added outside the controller 100. Therefore, the amount of the pins of the controller 100 can be reduced and cost for production will also be reduced.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A control circuit with a feedback terminal, comprising:
   a switching circuit generating a switching signal in response to a feedback signal;
   a sample-and-hold circuit sampling the feedback signal during a first period; and
   a current source coupled to the feedback terminal during a second period for generating a programming voltage;
   wherein a programmable signal is generated in accordance with the programming voltage and the feedback signal; the programmable signal is coupled to set a parameter.

2. The control circuit as claimed in claim 1, wherein the control circuit further comprises an adder for generating the programmable signal.

3. The control circuit as claimed in claim 2, wherein the sample-and-hold circuit generates a sample voltage by sampling the feedback signal during the first period, and the adder generates the programmable signal in response to the sample voltage and the programming voltage.

4. The control circuit as claimed in claim 1, wherein the current source associated with a resistor generates the programming voltage.

5. The control circuit as claimed in claim 1, wherein the feedback signal is correlated to an output of a power converter.

6. The control circuit as claimed in claim 1, wherein the switching signal is generated in response to the feedback signal for regulating an output of a power converter.

7. The control circuit as claimed in claim 1, wherein a current correlated to the current source flows into the feedback terminal and the programming voltage is generated and sampled by the sample-and-hold circuit during the second period.

8. A method for generating a programmable signal in a control circuit with a feedback terminal, comprising:
   sampling a feedback signal received from the feedback terminal during a first period;
   generating a programming voltage by providing a current at the feedback terminal during a second period;
   generating the programmable signal according to the feedback signal and the programming voltage for setting a parameter, and the first period and the second period do not overlap.

9. The method as claimed in claim 8, wherein providing a current comprises coupling a current source at the feedback terminal.

10. The method as claimed in claim 8, wherein generating the programmable signal according to the feedback signal and the programming voltage for setting a parameter comprises coupling the programming voltage to an adder.

11. The method as claimed in claim 8, wherein generating the programmable signal according to the feedback signal and the programming voltage for setting a parameter comprises coupling the feedback signal to an adder.

* * * * *